No. 661,880. Patented Nov. 13, 1900.
J. C. LINCOLN.
ELECTRIC BRAKE CONTROLLER.
(Application filed Oct. 2, 1899.)
(No Model.)
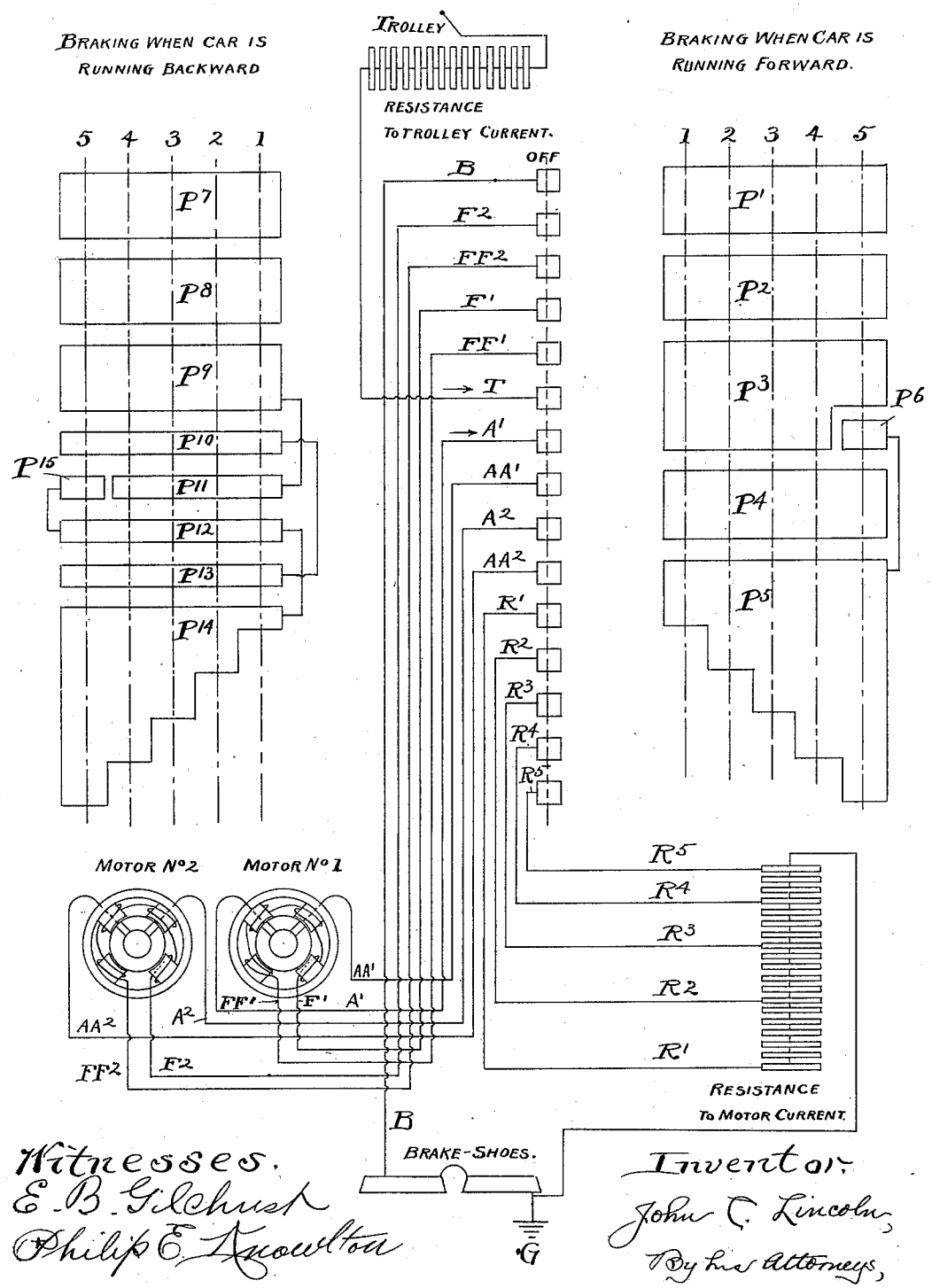

UNITED STATES PATENT OFFICE.

JOHN C. LINCOLN, OF CLEVELAND, OHIO, ASSIGNOR TO ARTHUR L. GARFORD, OF ELYRIA, OHIO.

ELECTRIC BRAKE-CONTROLLER.

SPECIFICATION forming part of Letters Patent No. 661,880, dated November 13, 1900.

Application filed October 2, 1899. Serial No. 732,292. (No model.)

*To all whom it may concern:*

Be it known that I, JOHN C. LINCOLN, a citizen of the United States, residing at Cleveland, in the county of Cuyahoga and State of Ohio, have invented a certain new and useful Improvement in Controllers, of which the following is a full, clear, and exact description, reference being had to the accompanying drawing.

My invention relates to brake-applying controllers primarily adapted for use with railway-motors.

The object is to provide such an arrangement of controller-contacts and such connections that the brake may be applied instantly without waiting for the field to build up from the armature-current and also that the car may be held on a grade after the motors have practically ceased to generate.

I accomplish these results by using the trolley-current to excite the fields of the motors when the brake is first applied and by letting such current flow through the brake after the motors have ceased revolving; and the invention consists of a controller and such connections that these objects, or either of them, are attained more particularly as hereinafter described.

The drawing represents diagrammatically my controller adapted to apply the brake when the car is running either forward or backward, a pair of motors, suitable governing resistances, and brake-shoes.

My controller is independent of the governing-controller of the motors, being simply connected by branch lines from the lines leading to the governing-controller. It is shown with five positions in each direction from the "off" position, successive positions cutting out resistance.

The reference characters $F'$ $FF'$ $F^2$ $FF^2$ represent the lines leading to and from the fields of the first and second motors, respectively, and the characters $A'$ $AA'$ $A^2$ $AA^2$ represent the corresponding armature-lines. $R'$ to $R^5$ indicate the lines to the governing resistance, T the line to the trolley, and B the line to the brake-shoes. $P'$ to $P^{15}$ indicate the contact-plates of the movable body, which are adapted to engage with the fingers to which the above-mentioned terminals are connected.

As shown in the diagram, the controller is at the off position, everything is disconnected, and the car is operated by the governing-controller as if there were no brake system present. If the car is running forward and if it is desired to apply the brake, the governing-controller is turned off and the brake-controller is turned to bring the contact-fingers into the line designated 1 in the right-hand system of contact-plates $P'$ to $P^6$. The current from the trolley then flows through the reducing resistance via the line T to the plate $P^3$. From here it passes to the line $FF'$ around the field of the motor No. 1 to the line $F'$, to plate $P^2$, to the line $FF^2$, around the field of motor No. 2 to the line $F^2$, to plate $P'$, to the line B, and through the brake-shoes to the ground G. The brake-shoes are electromagnets, which may (directly or indirectly, as desirable) grasp the track or the wheel. The reduced trolley-current thus instantly applies the brake and at the same time energizes the fields of the motors. The motors thus become at once strong generators, and a current flows from their armatures as follows: starting with the brake-shoes, through the resistance to the motor-current, through the line $R'$ to the contact-plate $P^5$ to the line $AA^2$, through the armature of the motor No. 2 to the line $A^2$, contact-plate $P^4$, to the line $AA'$, and through the armature of motor No. 1 to the line $A'$. This line is in contact with the plate $P^3$, and the armature-current joins with the trolley-current from there toward the ground G, flowing through the fields of the two motors and the brake-shoes. The revolving armature thus generates current, which not only additionally excites its field and causes the brake-shoes to grasp harder, but also tends to retard the armature, and thus the car. The currents from the armature and trolley are flowing in the same direction, as indicated by the arrows, and the trolley-current reduced by resistance is not sufficient to counteract the electromotive force of the armature, and although the ohmic resistance of the path through the armatures to the ground is less than through the fields the counter electromotive force of the armatures revolving even at slow speed prevents the reduced trolley-current taking the former path.

A movement of the controller to positions 2, 3, and 4, respectively, simply cuts out portions of the resistance through which the armature current flows, thus allowing that current to brake with sufficient force, notwithstanding the continually-retarded velocity of the armature. When the controller, however, is thrown into position No. 5, the resistance to the motor-current is entirely cut out, and this reduces the resistance of the path through the armatures to the ground G, and the electromotive force of the armatures dying down as they come to rest the trolley-current would more than counteract that electromotive force and flow through the armatures to the ground, and thus cease to energize the brake-shoes. To obviate this, I disconnect this armature-line from the trolley at this fifth position. The terminal A' thus passes off the plate P³ onto the plate P⁶, which is electrically connected with the plate P⁵, and this short-circuits the armatures upon themselves, bringing them to a sudden stop. At the same time the reduced trolley-current is left flowing through the brake-shoe, which holds the brake in engagement while the car is stopped. This is an important feature, as it allows the car to remain on a grade and not gradually run down, as has heretofore been the case if electric brakes only have held it. The amount of trolley-current which is used is only sufficient to hold the brake when the car has stopped or to energize the fields at the beginning, the current generated by the motors themselves being relied on for the main brake-applying force. If the trolley should be disconnected, the brake may still be applied, though it will not then operate as promptly.

The left-hand portion of the diagram shows the arrangement of the contact-plates for applying the brake when the car is running backward. The plates P⁷ P⁸ P⁹ connect the fields, as when the car is running forward, and the plate P¹⁴ operates to cut out the resistance in the same manner as the plate P⁵; but the plates P¹⁰ P¹¹ P¹² P¹³ direct the current through the armatures in the reverse direction, the positive armature-terminal (which is now AA') being connected, as before, with the trolley and field terminals. At position 5 the trolley-current is disconnected by the break in the plate P¹¹, while the plate P¹⁵, which engages with the armature-terminal AA', is connected with the plate P¹³, engaging with the armature-terminal A², whereby the two armatures are short-circuited upon themselves, as before. Thus whichever direction the car is running when the brake is first applied the trolley-current throws it immediately into action, and after the car has ceased running the trolley-current holds the brake-shoes in engagement.

Having described my invention, I claim—

1. The combination, with a source of electricity, an electric motor and a brake-magnet, of a controller adapted to connect the motor through the brake-magnet to generate current and apply the brake and adapted also to connect the current from said source through the brake-magnet and field-coils, substantially as described.

2. The combination with a motor, a brake-magnet, and a source of current-supply, of a controller adapted to close the motor through the brake-magnet in such direction that its movement generates current, and adapted to connect the independent source of supply through said brake-magnet and field-coils at the same time that the motor-current is flowing through them, substantially as described.

3. The combination, with a series-wound motor and an independent source of current-supply, of a controller adapted to close the motor on itself and adapted to direct current from said independent source through the same series field of such motor which energizes it in running at the same time that the armature-current from the motor as a generator is flowing through that field, whereby the motor-current may instantly apply the brake without waiting to build itself up, but after built up energizes its field, substantially as described.

4. The combination, with a series-wound motor and an independent source of current adapted to drive said motor, of a controller adapted to close the motor on itself and adapted to direct the current from said independent source through the main field of such motor, and an artificial resistance in the path of the current from such source to the field of the motor whereby the reduced current from the driving source causes the motor-current to instantly build up when closed as a brake without interfering with the motor-current energizing its field when built up, substantially as described.

5. The combination, with a motor having all its fields in series and an independent source of current-supply, of a controller adapted to close the motor on itself, and adapted to direct the current from said independent source through the field of such motor, an artificial resistance constant through an operation of braking in the circuit from the source of supply to the controller, and a variable resistance inserted in the motor-circuit by the controller, substantially as described.

6. The combination, with a motor, a brake-magnet, and a source of current-supply, of a controller which closes the motor through the brake-magnet and field-coils and through a governing resistance in such direction that the momentum of the car causes it to act as a brake and also connects the trolley-current through the brake-magnet when the motors have come to rest whereby the car may hold on a grade, substantially as described.

7. The combination with a motor and governing resistance and a source of current-supply, of a controller having a plurality of positions the first of which directs both the trolley-current and the armature-current through the fields of the motor, the intermediate ones of which cut governing resistance out of the armature-circuit and the final one of which causes the armature to be disconnected from the field-circuit but leaves the trolley-current flowing through the field, substantially as described.

8. The combination with a motor, a source of current-supply, and a brake-magnet, of a brake-applying controller which at each position connects the current from the source of supply through the fields of the motor and the brake-magnet, and which closes the armature on different circuits, that at the beginning of the operation being through a resistance, the fields and the brake-magnet, then the resistance being successively cut out, and then the armature being disconnected from the fields, substantially as described.

9. In a brake-applying controller for electric railways, a set of contact-fingers and two sets of contact-plates, one for use when the car is run forward, the other when it is run backward, said plates being so arranged and connected that one set closes the motors in the reverse direction from the other, each set having a position where the armatures are disconnected from the fields at which position the source of supply is connected through said fields whereby the car will be held electrically on a grade in either direction, substantially as described.

10. The combination, in a controller, of three contact-fingers which are terminals, first, of an armature of a motor; second, of a source of current-supply for the motor, and third, of a field of a motor, and a conductor movable relatively to said contact-fingers and adapted at one position to connect them all three together whereby current from the source of supply and the armature-current may flow through the fields, said controller having another position where the electric conductor connects the field and source of current but disconnects the armature-terminal, substantially as described.

11. The combination, with three contact-fingers which are terminals, first, from a current-supply; second, from the field of a motor, and, third, from the armature of such motor, of a movable conductor having a plurality of positions where it engages with said three contact-fingers, but having one position where it does not engage with said armature-terminal, and means for connecting the armature in such manner that the momentum shall generate current reaching said conductor in the same direction as the current from the source-of-supply terminal, substantially as described.

12. The herein-described means for braking by a series-wound motor without an extra field provided for braking, which consists of the combination of such motor, a conductor from a source of current-supply, a reducing resistance therefor, means for directing the current from said conductor through such resistance and through the ordinary field of the motor, and means for directing the current produced by the motor as a generator through such field, substantially as described.

In testimony whereof I hereunto affix my signature in the presence of two witnesses.

JOHN C. LINCOLN.

Witnesses:
H. M. WISE,
ALBERT H. BATES.